J. Allen.
Setting Mineral Teeth.
No. 8621.   Patented Dec. 23. 1851.
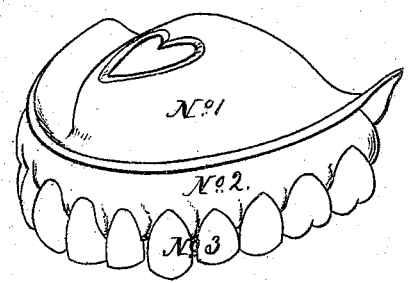

UNITED STATES PATENT OFFICE.

JOHN ALLEN, OF CINCINNATI, OHIO.

SETTING MINERAL TEETH.

Specification forming part of Letters Patent No. 8,621, dated December 23, 1851; Reissued March 24, 1857.

*To all whom it may concern:*

Be it known that I, JOHN ALLEN, of Cincinnati, in the county of Hamilton and State of Ohio, have invented a new and useful Mode of Setting Mineral Teeth on Metallic Plates; and I do hereby declare that the following is a full and exact description of the same.

To enable others skilled in the dental art to make and use my discoveries, I will proceed to describe the composition and mode of application.

The cement may be formed of any of the known fluxes, combined with silex, wedgewood, and asbestos, intermixed, with gold and platinum scraps, which forms a metallic union with the plate upon which the teeth are set. The compound which I prefer is composed of silex, 2 oz.; white or flint glass, 2 oz.; borax, 1 oz.; wedgewood, 1½ oz.; asbestos, 2 drms.; feldspar, 2 drms.; kaolin clay, 1 drm. This compound should be intermixed or underlaid upon the plate with gold and platinum scraps. The gum color consists of feldspar, ½ oz.; white glass, 1 oz.; oxid of gold, 1½ grs. Mix, moisten, and apply with a brush.

I construct my plates and arrange the teeth thereon in the usual way. I then apply the cement in a plastic state upon the outside, between and around the base of the teeth, so as to form an artificial gum upon the teeth and plate. The teeth, and gum, are then covered with a mixture of asbestos, and plaster of Paris mixed with water and reduced to a plastic state. The teeth being thus covered, the wax is removed from the inside of the teeth, and the cement is applied thereupon, and also upon the plate, so as to fill up all the interstices around the base of the teeth. When the cement and mixture thus applied become thoroughly dry, the work so united is put into a furnace, sufficiently heated, to fuse the cement, and immediately after the fusion thereof it is withdrawn from the furnace, and cooled slowly. The plaster mixture is then removed, and a gum color applied. The work is again placed in the furnace as before and when fused is withdrawn and cooled as before, by which means the metallic back plates, solder, and blow pipe are dispensed with, although back plates may be attached to the teeth if desired.

Finally, what I claim as my invention and desire to secure by Letters Patent, is—

1. A new mode of setting mineral teeth on metallic plates, by means of a fusible silicious cement, which forms an artificial gum, and which also unites single teeth to each other and to the plates upon which they are set.

2. I also claim to be the inventor of said cement or compound, a full and exact description of which is herein given.

3. I also claim the combination of asbestos with plaster of Paris for covering the teeth and plates for the purpose of sustaining them in their proper position while the cement is being fused.

In the accompanying drawings No. 1 represents the metallic plate; No. 2, the gum color; and No. 3 the mineral teeth.

JOHN ALLEN.

Attest:
   NIRWIN ALLEN,
   JOHN JONES.